United States Patent [19]
Jackson et al.

[11] 4,455,111
[45] Jun. 19, 1984

[54] PRESSURE CONVEYOR FOR FEEDING PULVERULENT MATERIAL INTO A PRESSURIZED AIR CONVEYOR PIPELINE

[75] Inventors: Carroll V. Jackson, Northbrook; Hazelton H. Avery, Aurora, both of Ill.

[73] Assignee: United Conveyor Corporation, Deerfield, Ill.

[21] Appl. No.: 278,060

[22] Filed: Jun. 29, 1981

[51] Int. Cl.³ .................................. B65G 53/48
[52] U.S. Cl. ...................... 406/56; 198/601; 198/608; 198/669; 414/218; 414/220; 414/221
[58] Field of Search .............. 406/53, 56, 61, 64, 406/118-120; 414/218, 220, 221; 198/548, 545, 601, 608, 669

[56] References Cited

U.S. PATENT DOCUMENTS

| | | | |
|---|---|---|---|
| Re. 20,440 | 7/1937 | Westberg et al. | 406/55 |
| 1,872,028 | 8/1932 | Collins. | |
| 1,889,126 | 11/1932 | Fletcher | 406/56 X |
| 2,311,773 | 2/1943 | Patterson | 406/56 |
| 2,393,412 | 1/1946 | Riddell. | |
| 2,644,725 | 7/1953 | Doull et al. | |
| 2,687,816 | 8/1954 | Messing | 414/220 |
| 3,223,228 | 12/1965 | Ferris et al. | |
| 3,232,419 | 2/1966 | Rasmussen. | |
| 3,339,530 | 9/1967 | Gillette. | |
| 4,363,571 | 12/1982 | Jackson | 406/56 |

Primary Examiner—John J. Love
Assistant Examiner—L. F. Williams
Attorney, Agent, or Firm—Wood, Dalton, Phillips, Mason & Rowe

[57] ABSTRACT

In a system for moving large quantities of pulverulent material from receiving hoppers, such as those of a fly ash precipitator, into a pressurized air conveyor pipeline, separate auger conveyors move material from a first line of receiving hoppers and from a second line of receiving hoppers downstream into gravity material inlets at opposite ends of an effectively airtight pressure conveyor casing. In the casing auger conveyor flights of opposite hand and substantially smaller than the casing means it toward a central outlet through which it drops into the pressurized air conveyor pipeline. Above the outlet the auger conveyor shaft has radial material agitating rods. The system is cycled to alternately feed material into the pressure conveyor casing at receiving hopper pressure, which is about atmospheric pressure, and out of the pressure conveyor casing at pipeline pressure. The pressure conveyor is pressurized through a series of air pressure pipes spaced along the casing substantially tangent to the lowermost part thereof, and casing pressure is relieved through a pipe above the central outlet.

6 Claims, 5 Drawing Figures

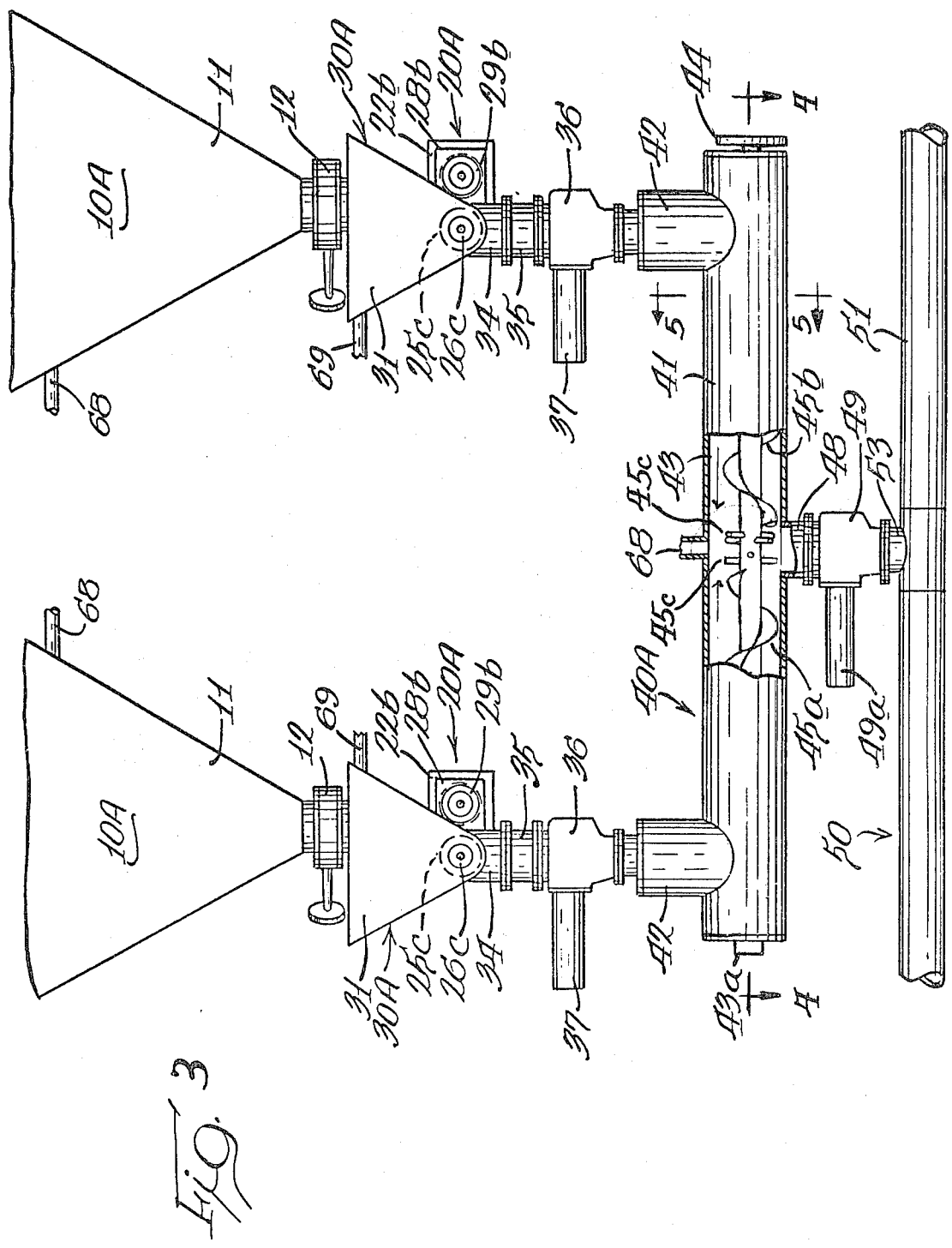

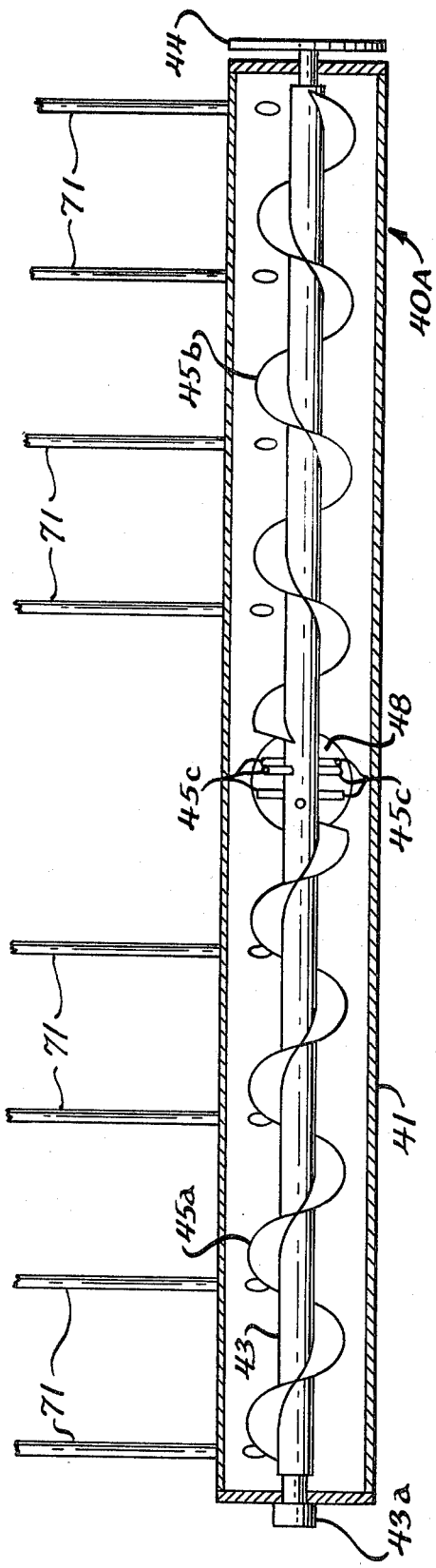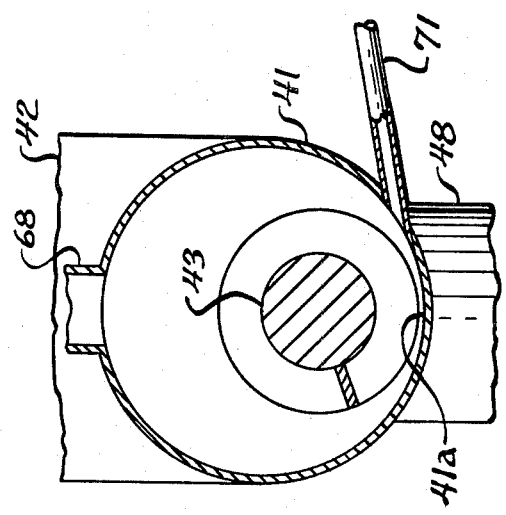

PRESSURE CONVEYOR FOR FEEDING PULVERULENT MATERIAL INTO A PRESSURIZED AIR CONVEYOR PIPELINE

CROSS REFERENCE TO RELATED APPLICATIONS

This application discloses and claims improvements upon the system of U.S. patent application Ser. No. 137,482 abandoned June 10, 1981, filed Apr. 4, 1980, by Carroll V. Jackson and Blase C. Rau, and a continuation of said application, Ser. No. 272,762 filed June 10, 1981, on which U.S. Pat. No. 4,363,571 issued on Dec. 14, 1982 both assigned to applicants' assignee.

BACKGROUND OF THE INVENTION

There are certain types of industrial operations which produce enormous quantities of pulverulent material. Orderly transfer of such material from the units that produce it to a transportation system presents substantial problems which are aggravated by the nature of the material which makes it inherently difficult to design systems for its orderly handling.

A severe problem is presented by the fly ash produced by the high efficiency coal burning furnaces and collected in the precipitators of electric power generating plants. A large coal burning power facility can produce many tons of fly ash an hour; and it is extremely difficult material to handle because it is about as fine as talcum powder, is very abrasive, and has a great tendency to lump and cake in hoppers and conveyors. This makes it hard to obtain a reasonably even flow of material into a device such, for example, as a pressure-type pneumatic conveyor which is very efficient for moving pulverulent material.

In the system disclosed and claimed in U.S. patent application No. 137,482 filed Apr. 4, 1980, pulverulent material is moved from the receiving hoppers of precipitators into a pressurized air conveyor pipeline by a system of mechanical transfer cnveyors from which the material drops by gravity into a pressure mechanical conveyor; and from the pressure mechanical conveyor the material passes into the pressurized air conveyor pipeline.

The receiving hoppers and the mechanical transfer conveyors operate at about atmospheric pressure; while the pressure mechanical conveyors are cyclically switched between receiving hopper pressure and a pressure equal to that in the pressurized air conveyor pipeline.

In a single feeding cycle the bottom gate valve which is between the pressure mechanical conveyor and the pressurized air conveyor pipeline is originally closed, and the top gate valves between the mechanical transfer conveyors and the pressure mechanical conveyors are open. The transfer mechanisms for moving material from the receiving hoppers, the conveyor means in the pressure mechanical conveyor, and the pipeline operate continuously. During a material receiving phase of the cycle the pressure mechanical conveyors must, of course, be at the same pressure as are the receiving hoppers and the transfer conveyors; and this pressure is about atmospheric.

At the end of the material receiving phase, which is controlled to effectively fill the pressure conveyor casing, the top gates are closed, a vent valve from the pressure mechanical conveyor is closed, and a pressure valve is opened to raise the pressure in the pressure mechanical conveyor casing to the same level as that in the pressurized air conveyor pipeline. When this pressure is equalized, the bottom gate valve is opened and the continuously operating pressure conveyor mechanism moves the material out of the pressure conveyor casing into the pressurized air conveyor pipeline during a material discharge portion of the cycle.

After effectively all the material in the pressure mechanical conveyor casing has been discharged, the bottom gate and the pressure valve are closed and the vent valve for the pressure mechanical conveyor casing is opened to return that unit to receiving hopper pressure, whereupon the top gates are opened to start a new cycle. The cycle is controlled to effectively entirely fill and empty the pressure mechanical conveyor casing.

In a plant the receiving hoppers may be divided into two or more sets, in application No. 137,482 and here for convenience limited to two sets (I and II); and each set has an A section and a B section. While the pressure mechanical conveyor of the I-A section is in the first, or filling portion of a cycle, the pressure mechanical conveyor for the I-B section is in the second, or discharge portion of the cycle. The pressure mechanical conveyors of the II-A and II-B sections are one-quarter cycle out of phase with those of the I-A and I-B sections.

In addition, the two ends of a pressure mechanical conveyor casing receive material simultaneously from two transfer conveyors; and in the casing are conveyors which are driven to move material from both ends toward the transverse median plane of the casing to be fed into the pressurized pipeline through a bottom gate valve which is on that transverse median plane.

Preferably the transfer conveyor mechanisms and the pressure conveyor mechanisms are augers; and in the latter units there are two augers of opposite hand on a single shaft.

SUMMARY OF THE INVENTION

During testing of a prototype of the system disclosed in U.S. patent application No. 137,482, which was used experimentally to handle fly ash from a precipitator, it was found that under certain operating conditions the system tended to clog in the pressure mechanical conveyor casings.

Applicants were successful in alleviating the problems encountered in the prototype by the improved pressure conveyor disclosed and claimed in the present application.

The pressure conveyor is rebuilt in three respects. First, the airtight casing is made considerably larger than the auger conveyor, and the circle of rotation of the conveyor flight is as close as possible to the bottom of the casing. Second, the helical auger conveyor flights of opposite hand terminate a short distance from one another, and several radially extending material agitating rods are mounted upon the auger shaft between the adjacent ends of the conveyor flights immediately above the outlet to the pressurized air conveyor pipeline.

Third, the air pressurizing lines which, in the apparatus of application 137,482 admit the pressurized air to the inlets of the pressure conveyor casing, are changed to vent lines; and pressurizing is carried out by a series of air pressure pipes which are spaced along the pressure conveyor casing and open into the casing substantially tangent to the lowermost part of the casing.

THE DRAWINGS

FIG. 3 is a fragmentary elevational view on an enlarged scale, partly in section, taken substantially as indicated along the line 3—3 of FIG. 1;

FIG. 4 is a fragmentary sectional view taken substantially as indicated along the line 4—4 of FIG. 3; and FIG. 5 is a fragmentary sectional view taken substantially as indicated along the line 5—5 of FIG. 3.

DETAILED DESCRIPTION OF THE INVENTION

Figure 1:
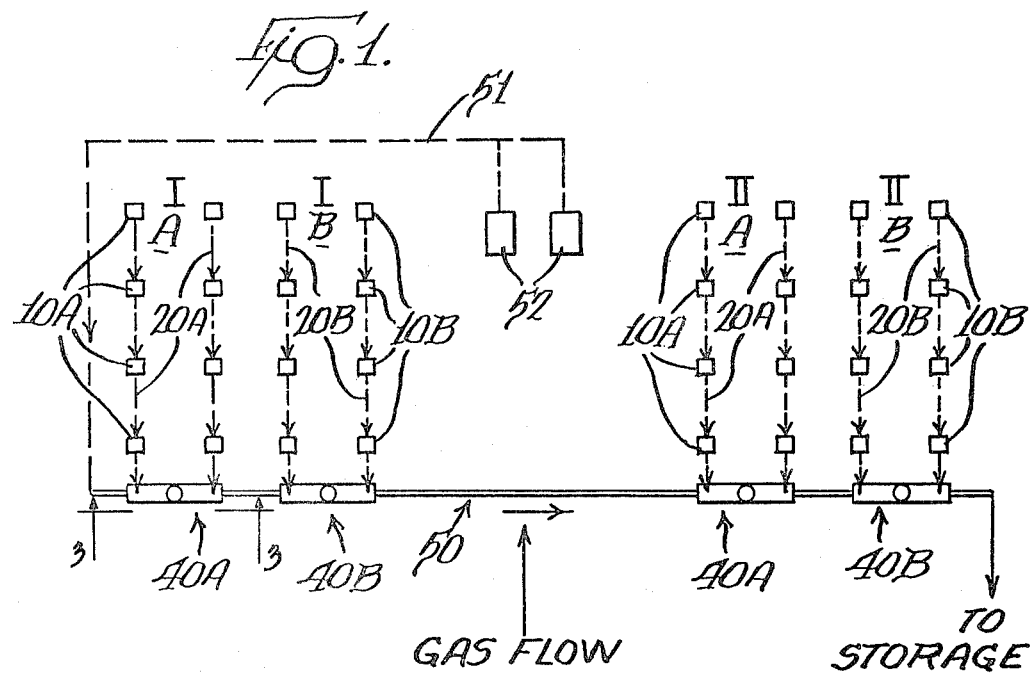
FIG. 1 is a diagrammatic plan view of a typical system in which the improved pressure mechanical conveyors of the present invention are utilized.
Figure 2:
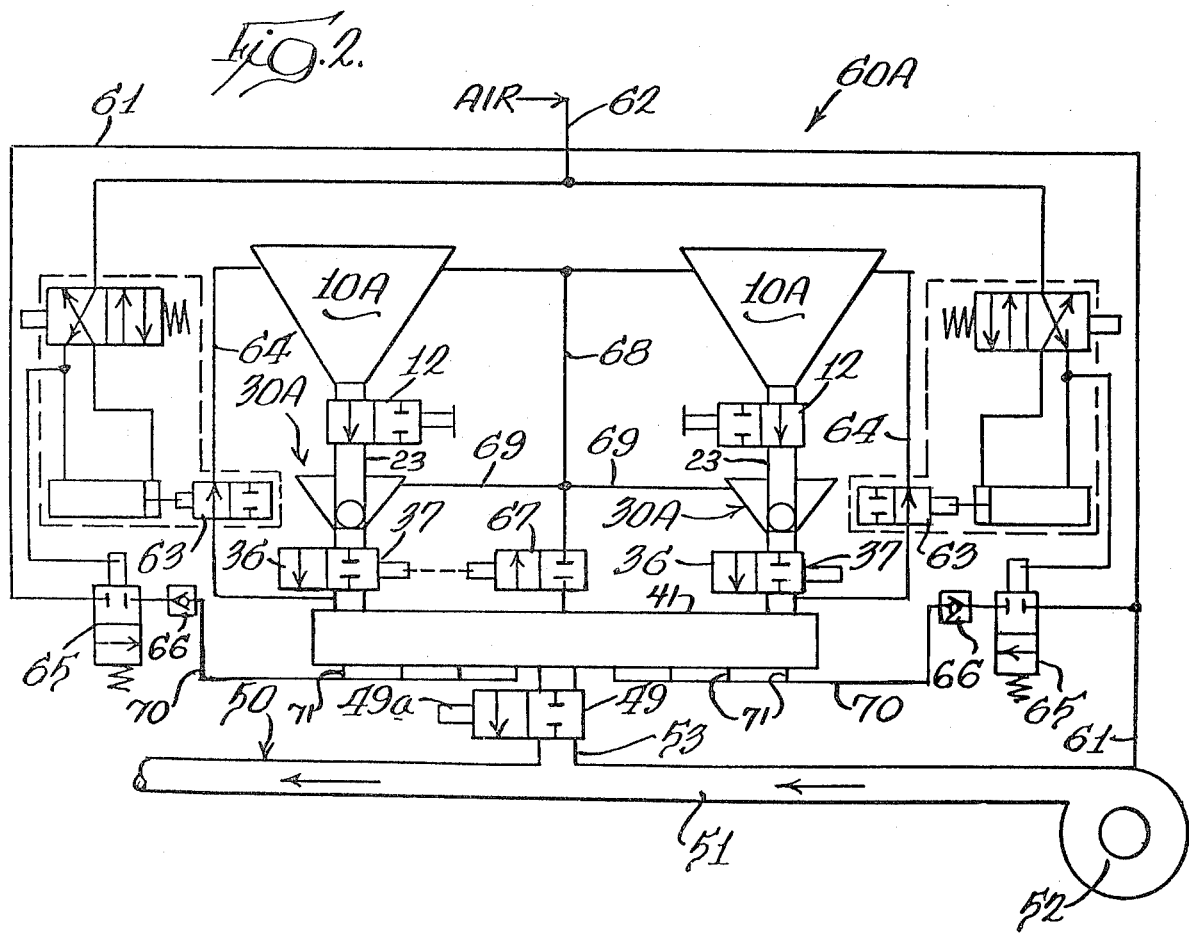
FIG. 2 is a diagram of the air and valve system for the A section surge hoppers and pressure conveyor.

Referring to the drawings in detail, and referring first to FIGS. 1 and 2, a typical system utilizing the improved pressure screw conveyors of the present invention consists generally of a set I and a set II, each consisting of sixteen precipitator receiving hoppers. Each set has an A section of eight receiving hoppers, each indicated generally at 10A; a B section of eight receiving hoppers, each indicated generally at 10B; transfer conveyor screw means, indicated generally at 20A and 20B, to move pulverulent material from the respective receiving hoppers 10A and 10B; respective surge hoppers for the two sections such as the surge hoppers indicated generally at 30A in FIG. 2; pressure screw conveyors, indicated generally at 40A and 40B, for the respective sections; pressurized air conveyor means, indicated generally at 50; and two air and valve systems such as the system indicated generally at 60A in FIG. 2, for varying air pressure in the pressure screw conveyors 40A and 40B and for venting the surge hoppers 30A and 30B. A control system causes the entire feeding system to operate in accordance with the cycles disclosed in application Ser. No. 137,482.

It is apparent from FIGS. 1 and 2 that a single transfer screw conveyor means 20A moves material from four receiving hoppers 10A; and that a single pressure screw conveyor 40A or 40B receives material from two transfer screw conveyors 20A or 20B so that each pressure screw conveyor 40A or 40B handles the material from eight receiving hoppers 10A or 10B.

In FIGS. 1 and 3 the arrow indicating direction of gas flow shows the direction in which fly ash travels in the precipitator. The receiving hoppers 10A or 10B which are farther downstream receive progressively less ash. In order to minimize wear of the transfer screw means 20A and 20B, the delivery of ash from the receiving hoppers is counter to the gas flow; so that most of the ash travels the shortest distance to the pressure screw conveyors 40A or 40B.

Turning now to FIG. 3 for the construction of the various components of the system, each of the receiving hoppers 10A and 10B is seen to consist of the usual bin 11 which, in a fly ash handling system, receives ash from the fly ash precipitators of a coal burning furnace. At the lower end of each bin 11 is an isolation valve 12 which connects to the transfer screw means 20A.

Each of the transfer screw means 20A and 20B comprises a series of cylindrical housings and offset transfer boxes such as 22b. The housings have inlet pipes 23 which communicate with the isolation valves 12. Auger shafts extend the full lengths of the respective housings and fixed directly on the shafts are respective helical auger conveyor webs such as the web 25c. The augers in the housings overlap at the transfer boxes; so that material is moved from auger to auger in each transfer screw means.

Each auger is driven by an electric motor such as the motor 29b.

Each of the surge hoppers 30A consists of a bin 31 above the last transfer screw housing; and at the lower end of each of the surge hopper bins 31 is a discharge throat 34 which connects through an expansion joint 35 with a top material control gate valve, indicated generally at 36, which is a device in which gate operation is by means of any suitable pneumatic or hydraulic cylinder 37.

As seen in FIGS. 3 to 5, each of the pressure screw conveyors 40A and 40B consists of an effectively airtight cylindrical casing 41 which has an inlet pipe 42 near each of its ends that makes a flanged connection with the lower or outfeed side of one of the top gate valves 36. An auger shaft 43 in the casing 41 has one end supported in a journal 43a at one end of the casing, while the other end of the shaft carries a drive sheave or sprocket 44. Screw conveyor flights 45a and 45b of opposite hand are mounted upon the auger shaft 43, and the auger shaft 43 is driven by an electric motor (not shown) in a direction to move material from both ends of the casing 41 toward the transverse median plane of the casing as indicated by the arrows in FIGS. 3.

On the transverse median plane of the casing 41 is a discharge pipe 48 which makes a flanged connection to a bottom material control gate valve, indicated generally at 49 which, like the top gate valves 36, is a device in which gate operation is by means of any suitable pneumatic or hydraulic cylinder 49a.

As best seen in FIGS. 4 and 5, the pressure conveyor casing 41 is of substantially larger diameter than the screw conveyor flights 45a and 45b; and the shaft 43 is so located with respect to the casing 41 that the cylinder of rotation R of the flights 45a and 45b is very slightly spaced from the lowermost point 41a of the casing.

As seen in FIGS. 3 and 4, the adjacent ends of the screw conveyor flights 45a and 45b are separated by a distance which is approximately equal to the diameter of the discharge pipe 48; and in the open space of the shaft 43 above the discharge pipe are several radially extending material agitators 45c.

The pressure screw conveyor 40A is pressurized through a pair of pressurizing lines 70 each of which has several air pressure pipes 71 which are seen in FIG. 5 to enter the lower portion of the pressure screw conveyor casing 41 substantially tangent to the lowermost points 41a of the casing. The way in which the pressurizing lines 70 are connected to the hydraulic circuit for the system will be described hereinafter.

The pressure conveyor 50 is seen in FIG. 1 to consist of a pipeline 51 which is connected to a low pressure air blower 52; and the pipeline 51 runs directly beneath the four pressure screw conveyors 40A and 40B and is provided with four inlet pipes 53 each of which makes a flanged connection with the lower, or discharge end of one of the bottom gates 49. The pipeline 51 is of a conventional type commonly used to move pulverulent material to a storage silo.

Referring now to FIG. 2, the air and valve system 60A consists of a pressure conduit 61 which is operatively connected to the low pressure source 52 and a high pressure air line 62. FIG. 2 illustrates all the valves in the air and valve system 60A in the positions that they occupy at a time 0.1 second after the beginning of a cycle. All the valves in the system are closed except for open vent valves 63 and 67 which put the pressure screw conveyor casing 41 into communication with the receiving hoppers 10A through respective conduits 64 and 68, so the interior of the casing is at receiving hopper pressure. The vent valve 67 is operated by one of the hydraulic cylinders 37 which operates a top material control gate valve 36.

In addition to the conduits 64 and 68 from the pressure screw conveyor casing 41, there are vent lines 69 from the surge hoppers 30A which join the conduit 68 above the vent valve 67, so that the surge hoppers 30A are always in communication with the receiving hoppers 10A and thus remain at receiving hopper pressure.

The system 60A also includes pressurizing diaphragm valves 65 which control the admission of low pressure air from the line 61 to the pressure screw conveyor air pressurizing pipes 70 and air pressure pipes 71. Check valves 66 between the pressure screw conveyor casing 41 and the diaphragm valves 65 prevent material from the casing 41 from being blown into the valves 65 and blower 52 if the blower motor is stopped for any reason.

The pressure screw conveyor structure disclosed in application No. 137,482 had a tendency to malfunction because of packing of material in the pressure screw conveyor flights and, particularly, in the central area of the casing immediately above the discharge opening.

In the present structure, during the discharge phase of a cycle, pressurizing air is blown into the casing all along the screw conveyor and this, together with the additional space in the casing above the screw conveyor, eliminates the problem of material packing along the length of the conveyor. In addition, in the present structure the space between the adjacent ends of the screw helices 45a and 45b, together with the addition of the material agitating rods 45c, eliminates any tendency for the material to pack at the entrance to the material outlet 48.

The present apparatus may operate on a cycle precisely like that described in U.S. patent application No. 137,482. It is believed to be sufficient for purposes of the present application to state that the augers of the transfer screw means 20A and 20B, and the auger shafts 43 in the pressure screw conveyors 40A and 40B operate continuously. The system operates through continuously repeating cycles in which the valves 36 are first opened to move material from the transfer conveyors 20A into the pressure conveyor casing 41 with the outlet valve 49 between the pressure conveyor casing and the pipeline 51 closed.

After a filling phase of the cycle the valves 36 are closed to stop the feed of material into the pressure screw conveyor casing 41, and the vent valves 63 and 67 are simultaneously closed. The valves 65 are then opened to admit low pressure air to the casing through the pressurizing lines 70 and the pressure pipes 71, and after a short time to equalize pressure between the interior of the casing and the pipeline 51, the valve 49 is opened to feed all the material from the casing into the pipeline.

The valve 49 and the valves 65 are then closed, the valves 63 and 67 are opened, and after a brief time to reduce pressure in the casing 41 to atmospheric pressure, the valves 36 are reopened to again feed material into the pressure screw conveyors.

The several time intervals in a cycle, as actually used in testing of the prototype heretofore referred to, are fully described in application No. 137,482.

The foregoing detailed description has been given for clearness of understanding only, and no unnecessary limitations should be understood therefrom as modifications will be obvious to those skilled in the art.

We claim:

1. A system for moving pulverulent material from a receiving hopper into a pressurized air conveyor pipeline comprising, in combination:

pressurized mechanical conveyor means which has an effectively airtight casing, a material inlet in the top of said casing, a material outlet in the bottom of the casing remote from said inlet, said outlet communicating with the top of the air conveyor pipeline, and rotatably driven auger conveyor means in said casing to move material from said inlet toward said outlet, said auger conveyor means comprising a shaft with a helical flight thereon the diameter of which is substantially less than that of the casing, and said shaft being so located in the casing that said flight has a circle of rotation slightly out of contact with the lowermost part of the casing;

mechanical transfer conveyor means for moving material from the receiving hopper and dropping it by gravity into said material inlet at a controlled rate;

a primary valve means to control movement of material through said inlet;

secondary valve means to control movement of material through said outlet;

means for varying the air pressure in said casing between receiving hopper pressure and pipeline pressure, said means comprising a plurality of air pressure pipes for admitting air at pipeline pressure to the lower part of said casing, said pipes being spaced along the casing between the material inlet and the material outlet and entering said casing transversely substantially tangent to the lowermost part thereof so air from said pipes enters the space in the casing below the auger flight, and an air discharge pipe for releasing air from the casing;

and control means for filling said casing at receiving hopper pressure and emptying said casing at pipeline pressure in a predetermined continuous cycle.

2. The combination of claim 1 in which there is a material inlet adjacent each end of the casing, the material outlet is on the vertical median plane of the casing, the auger conveyor means has flights of opposite hand between the material inlets and the material outlet, and there are air inlet pipes spaced along the casing between each material inlet and the material outlet.

3. The combination of claim 2 in which the adjacent ends of the auger conveyor flights are spaced a short distance apart, and there are material agitating rods on the shaft between said adjacent ends and above the material outlet.

4. In a system for feeding pulverulent material from a receiving hopper into a pressurized air conveyor pipeline, pressurized mechanical conveyor means comprising, in combination:

an effectively airtight casing;

a material inlet in the top of said casing for admitting pulverulent material from a receiving hopper;

a material outlet in the bottom of the casing remote from said inlet and adapted to communicate with the top of the air conveyor pipeline;

rotatably driven auger conveyor means in the casing to move material from said inlet to said outlet, said auger conveyor means comprising a shaft with a helical flight thereon the diameter of which is substantially less than that of the casing, and said shaft being so located in the casing that said flight has a circle of rotation slightly out of contact with the lowermost part of the casing;

a plurality of air pressure pipes for admitting air at pipeline pressure to the lower part of said casing, said pipes being spaced along the casing between the material inlet and the material outlet and entering said casing transversely substantially tangent to the lowermost part thereof so air from said pipes enters the space in the casing below the auger flight;

and an air discharge pipe for releasing air from the casing.

5. The combination of claim 4 in which there is a material inlet adjacent each end of the casing, the material outlet is on the vertical median plane of the casing, and the auger conveyor means has flights of opposite hand between the material inlets and the material outlet, and there are air inlet pipes spaced along the casing between each material inlet and the material outlet.

6. The combination of claim 5 in which the adjacent ends of the auger conveyor flights are spaced a short distance apart, and there are material agitating rods on the shaft between said adjacent ends and above the material outlet.

* * * * *